United States Patent
Wada

(10) Patent No.: US 6,803,953 B2
(45) Date of Patent: Oct. 12, 2004

(54) IMAGE SENSING APPARATUS AND METHOD HAVING NOISE REDUCTION FUNCTION

(75) Inventor: Hidetoshi Wada, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 767 days.

(21) Appl. No.: 09/794,472

(22) Filed: Feb. 27, 2001

(65) Prior Publication Data

US 2001/0055067 A1 Dec. 27, 2001

(30) Foreign Application Priority Data

Feb. 28, 2000 (JP) .................................. 2000-051096

(51) Int. Cl.$^7$ .................... H04N 5/217; H04N 5/228
(52) U.S. Cl. ........................ 348/241; 348/208.99
(58) Field of Search ........................ 348/241, 242, 348/253, 272, 273, 231.6, 208.99, 208.1, 208.4, 208.12, 230.1

(56) References Cited

U.S. PATENT DOCUMENTS 5,534,921 A * 7/1996 Sawanobori ............ 348/231.6
5,905,530 A * 5/1999 Yokota et al. ............ 348/241
6,473,120 B2 * 10/2002 Hirasawa et al. ........ 348/208.1

* cited by examiner

Primary Examiner—Aung Moe
(74) Attorney, Agent, or Firm—Morgan & Finnegan LLP

(57) ABSTRACT

In an image sensing apparatus which performs noise reduction processing using pixel signals obtained by consecutively scanning a CCD image sensor at different timings, for performing image expansion in the vertical direction by controlling scanning of the CCD image sensor, an area to be read in the CCD image sensor is set on the basis of an expansion ratio. Pixel signal which have undergone the noise reduction processing and stored in advance in a memory are read so that colors of corresponding pixel signals do not shift. The noise reduction processing is performed on the current pixel signals read from the set area using the pixel signals read from the memory. The noise-reduced pixel signals are stored in the memory, and used in the next noise reduction processing for pixel signals read from the CCD image sensor of the next period.

22 Claims, 15 Drawing Sheets

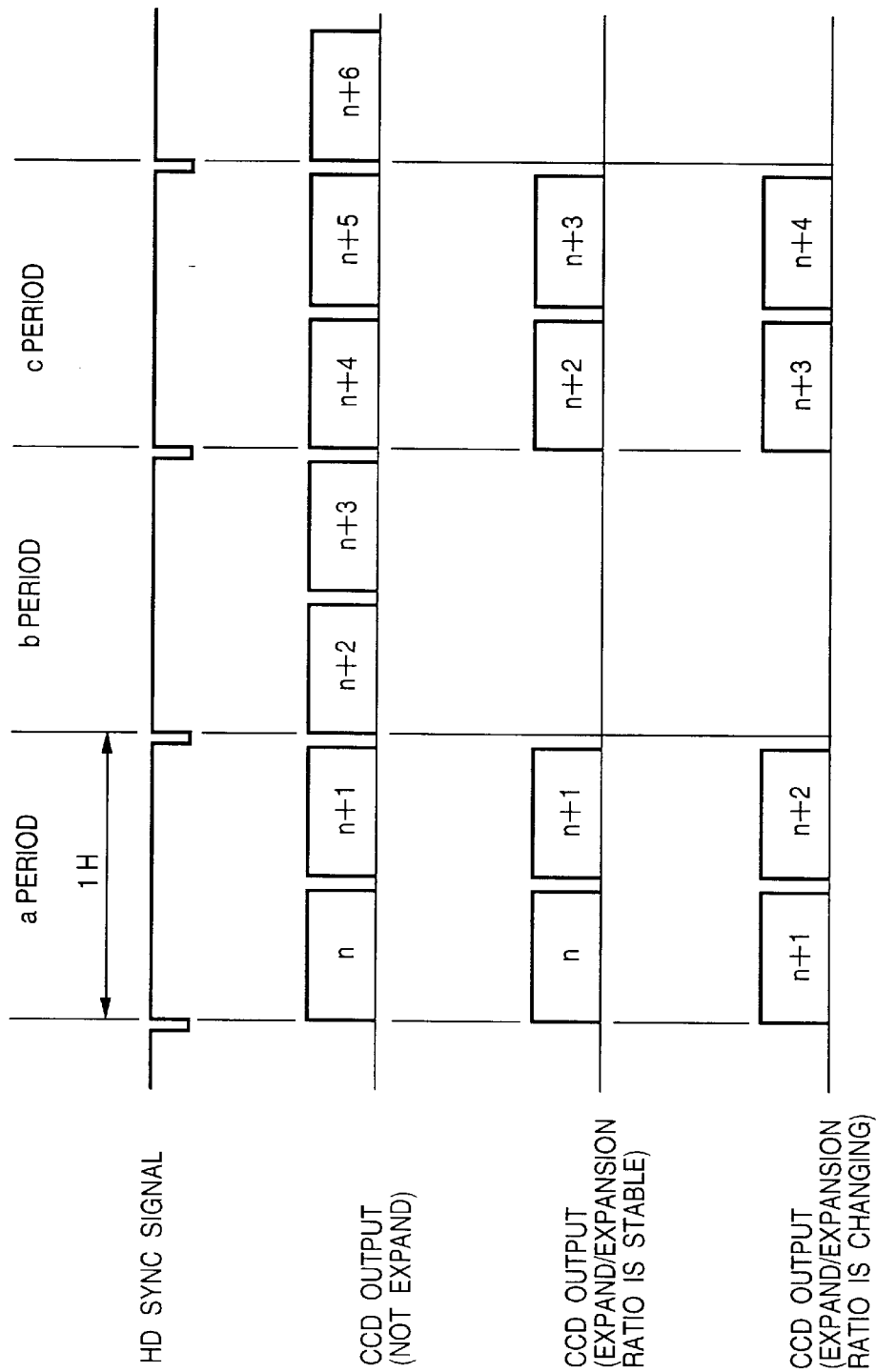

FIG. 2B

| FIELD MEMORY | NOT EXPAND | EXPAND (EXPANSION RATIO IS STABLE) | EXPAND (EXPANSION RATIO IS CHANGING) |
|---|---|---|---|
| ⋮ | ⋮ | ⋮ | ⋮ |
| n | a PERIOD | a PERIOD | a PERIOD |
| n+1 | | | |
| n+2 | b PERIOD | c PERIOD | c PERIOD |
| n+3 | | | |
| n+4 | c PERIOD | | |
| n+5 | | | |
| n+6 | | | |
| ⋮ | ⋮ | ⋮ | ⋮ |

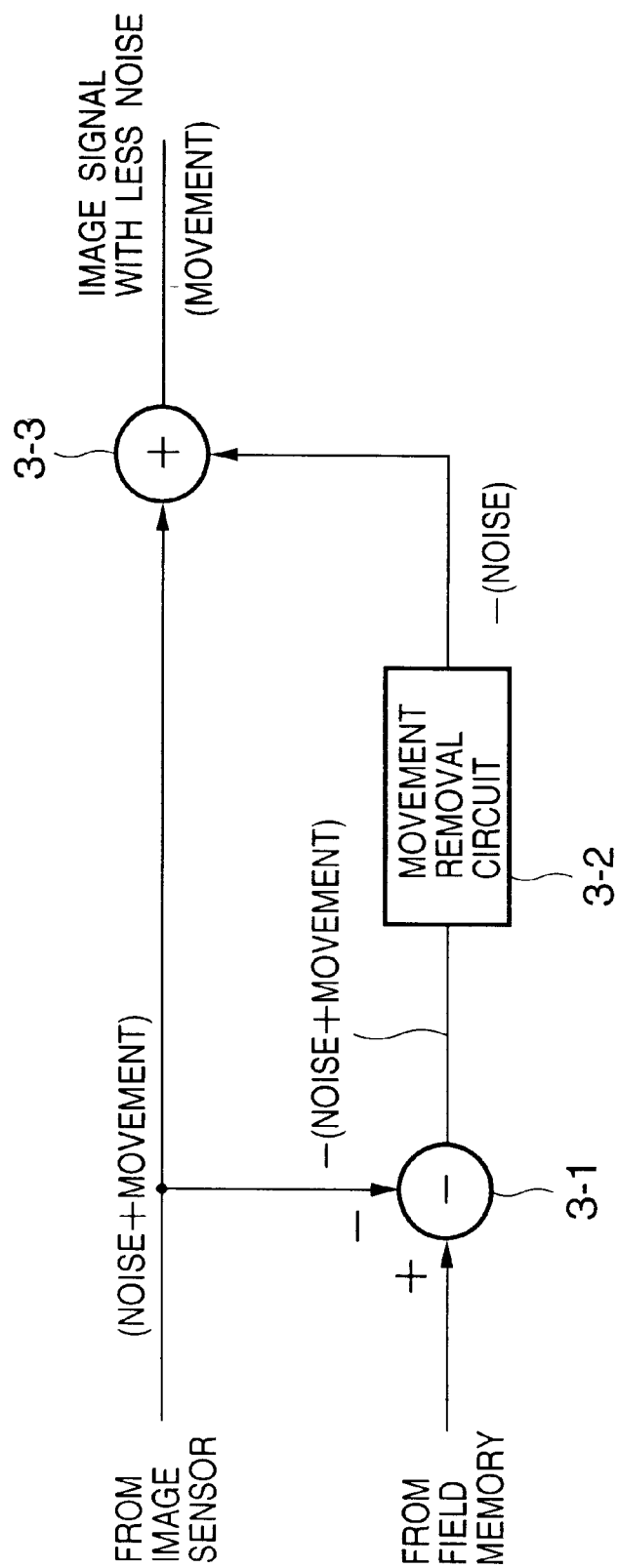

FIG. 14

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

IMAGE SENSING APPARATUS AND METHOD HAVING NOISE REDUCTION FUNCTION

FIELD OF THE INVENTION

The present invention relates to an image sensing apparatus and method having a noise reduction function.

BACKGROUND OF THE INVENTION

FIG. 3 is a block diagram illustrating a configuration of a field circulation type noise reduction circuit. To one of its input terminals, pixel signals output from an image sensor are inputted after being digitized by an analog-digital converter. To the other input terminal, pixel signals of the previous field outputted from the noise reduction circuit are inputted from a field memory.

The pixel signals inputted from the image sensor includes a movement component and a noise component. By subtracting the input signals from the image sensor from the signals of the previous field outputted from the field memory in the subtractor 3-1, a resultant signal component, i.e., input signal −(noise component+movement component), is outputted from the subtractor 3-1. Then, in the movement removal circuit 3-2, the movement component is removed from the output signal from the subtractor 3-1. The movement removal circuit 32 comprises a limiter, and does not output a signal having a frequency lower than a predetermined frequency. Accordingly, a movement component whose frequency is relatively low is removed, and only a noise component whose frequency is relatively high is outputted. Thus, only −(noise component) is outputted from the movement removal circuit 3-2. Then, by adding the pixel signals inputted from the image sensor and the signals outputted from the movement removal circuit 3-2 in an adder 3-3, a movement component (=(movement component+noise component)−(noise component)) is obtained with the noise component being removed. The signal from which the noise component is removed is stored in the field memory, and the stored signal is outputted to the subtractor 3-1 for the process in the next field.

In the aforesaid method of noise reduction processing, correlation between images sensed at consecutive timing is utilized. Therefore, if an object is still with respect to the image sensing apparatus, then corresponding points of two images sensed at consecutive different times, namely, pixel signals inputted from the image sensor to the movement removal circuit 3-2 and pixel signals inputted from the field memory to the movement removal circuit 3-2, should be expressed by the same pixel in the two images difference. In a case where the corresponding points are expressed by pixels at considerably different positions in the two images, namely, when the object moves greatly with respect to the image sensing apparatus, since there is naturally a limitation in reducing movement in the movement removal circuit 3-2, there is a possibility that effects of noise reduction will be reduced, or can not be expected at all.

Further, as a method of performing noise reduction processing in an image processing apparatus, there are a method of performing the aforesaid noise reduction processing after changing pixel signals outputted from the image sensor into luminance signals and chromatic signals in a camera signal processing circuit, and a method of performing the noise reduction processing on the pixel signals outputted from the image sensor before inputted to the camera signal processing circuit.

In the latter method, since noise reduction is performed before γ processing which non-linearly increase levels of signals ranging from low frequency to middle frequency whose S/N ratio is small is applied to the pixel signals in the camera signal processing circuit. Thus, an effective noise reduction can be realized.

As a method of electrically expanding a sensed image by way of image processing, there is a method in which the sensed image is written in a frame memory or a field memory, and signals are outputted while interpolating between the signals to realize expansion. In this method, pixel signals outputted from the image sensor are converted to luminance and chromatic signals by way of camera signal processing, then expanded.

Further, there is an expansion method performed without a relatively expensive frame memory or field memory. In the method, a line memory is used for expansion in the lateral direction and expansion in the longitudinal direction is realized by controlling the image sensor. FIG. 13 is a schematic view for explaining double-sizing expansion processing, and each box corresponds to each pixel of the image sensor (area sensor). FIG. 12 shows an example of a configuration of the image sensor, and FIG. 14 is an explanatory view showing an example of filter arrangement provided on the surface of the image sensor. In FIG. 13, only an 8×8 pixel array is shown to simplify the explanation, however, the image sensor usually has a great number of pixels.

In the expansion, upper one-fourth of lines (L1 and L2 in FIG. 13) is scanned fast and the scanned pixel signals are discarded. Then, the central lines corresponds to one-half of all the lines (L3 to L6 in FIG. 13) of the image sensor are scanned normally, then, the read signals are written in the line memory. If the image sensor is of a type of reading signals by two lines in a single horizontal scan period, Upon reading these central lines, they are read by two lines every other predetermined period (horizontal scan period) so as to obtain pixel signals by a set of color filters (i.e., G (green), R (red), B (blue), G in FIG. 14). The written signals are read out from the line memory during a period in which the scanning is not performed. Accordingly, each line is outputted twice, namely, from the image sensor, and then from the line memory. After the central lines (½ of all the lines) are read out, the remaining one-fourth portion (L7 and L8 in FIG. 13) are scanned fast and obtained signals are discarded. In this manner, it is possible to expand the image twice larger than the original size in the longitudinal direction. A method of double-sizing the image in the longitudinal direction by reading each line twice is explained above, however, it is possible to continuously expand an image by interpolating between the read pixel signals by an arbitrary expansion ratio.

However, a problem may be posed when performing the noise reduction processing on pixel signals read from the image sensor and performing the image expansion processing in the longitudinal direction by controlling the image sensor.

When the image sensor have a color filter of a check pattern of the primary colors as shown in FIG. 14, and an expansion ratio in the longitudinal direction is continuously changed by controlling scanning of the image sensor as in the method described above, pixel signals corresponding to repetition of R and G filters may be read out as a first line of the central portion of an image to be expanded in one field, while pixel signals corresponding to repetition of G and B filters may be read out as a first line in the next field.

In other words, colors of lines which are read as the first line in two consecutive fields may be different from each other.

In such a case, colors of pixel signals of the previous field will be mixed with colors of the current pixel signals and the resultant pixel signals outputted from the noise reduction circuit would be signals whose luminance and chromatic information are damaged.

Further, similar problem may be posed when performing the aforesaid noise reduction processing while performing electrical blur correction in place of the image expansion processing.

SUMMARY OF THE INVENTION

The present invention has been made in consideration of the above situation, and has as its object to obtain proper color reproduction after noise reduction in a case where electrical processing such as image expansion and blur correction are performed in an image sensing apparatus having a circulation type noise reduction processing function.

According to the present invention, the foregoing object is attained by providing an image sensing apparatus comprising: an area image sensor; a sensor operation unit which controls scanning operation of the area image sensor; area setting means for setting an area to be read of the area image sensor by controlling the sensor operation unit on the basis of an expansion ratio; a noise reduction unit which performs noise reduction processing on pixel signals obtained by consecutively scanning the area image sensor at different timings; memory which holds the pixel signals from which noise has been reduced by the noise reduction unit; a memory controller which controls reading of pixel signals from the memory in accordance with the area to be read set by the area setting means; and an expansion unit which expands an image using the pixel signals outputted from the noise reduction unit on the basis of the expansion ratio, wherein the pixel signals used in the noise reduction unit are pixel signals read from the memory and respective current pixel signals obtained by scanning the area image sensor.

According to the present invention, the foregoing object is also attained by providing an image sensing apparatus comprising: an area image sensor; a sensor operation unit which controls scanning operation of the area image sensor; a blur detector which detects blur information of a sensed image; area setting means for setting an area to be read of the area image sensor by controlling the sensor operation unit on the basis of the blur information; a noise reduction unit which performs noise reduction processing on pixel signals obtained by consecutively scanning the area image sensor at different timings; memory which holds the pixel signals from which noise has been reduced by the noise reduction unit; a memory controller which controls reading of pixel signals from the memory in accordance with the area to be read set by the area setting means; and a blur correction unit which corrects blurs of an image using the pixel signals outputted from the noise reduction unit on the basis of the blur information detected by the blur detection unit, wherein the pixel signals used in the noise reduction unit are pixel signals read from the memory and respective current pixel signals obtained by scanning the area image sensor.

Further, the foregoing object is also attained by providing an image processing apparatus for processing pixel signals obtained from an image sensing apparatus having an area image sensor and a sensor operation unit which controls scanning operation of the area image sensor, comprising: area setting means for setting an area to be read of the area image sensor by controlling the sensor operation unit on the basis of an expansion ratio; a noise reduction unit which performs noise reduction processing on pixel signals obtained by consecutively scanning the area image sensor at different timings; memory which holds the pixel signals from which noise has been reduced by the noise reduction unit; a memory controller which controls reading of pixel signals from the memory in accordance with the area to be read set by the area setting means; and an expansion unit which expands an image using the pixel signals outputted from the noise reduction unit on the basis of the expansion ratio, wherein the pixel signals used in the noise reduction unit are pixel signals read from the memory and respective current pixel signals obtained by scanning the area image sensor.

Furthermore, the foregoing object is also attained by providing an image processing apparatus for processing pixel signals obtained from an image sensing apparatus having an area image sensor, a sensor operation unit which controls scanning operation of the area image sensor, and a blur detector which detects blur information of a sensed image, comprising: area setting means for setting an area to be read of the area image sensor by controlling the sensor operation unit on the basis of the blur information; a noise reduction unit which performs noise reduction processing on pixel signals obtained by consecutively scanning the area image sensor at different timings; memory which holds the pixel signals from which noise has been reduced by the noise reduction unit; a memory controller which controls reading of pixel signals from the memory in accordance with the area to be read set by the area setting means; and a blur correction unit which corrects blurs of an image using the pixel signals outputted from the noise reduction unit on the basis of the blur information detected by the blur detection unit, wherein the pixel signals used in the noise reduction unit are pixel signals read from the memory and respective current pixel signals obtained by scanning the area image sensor.

Further, the foregoing object is also attained by providing an image sensing method in an image sensing apparatus having an area image sensor and a sensor operation unit which controls scanning operation of the area image sensor, comprising: an area setting step of setting an area to be read of the area image sensor by controlling the sensor operation unit on the basis of an expansion ratio; a scanning step of scanning the area of the area image sensor set in the area setting step; a reading step of reading pixel signals previously stored in a memory in accordance with the area set in the area setting step; a noise reduction step of performing noise reduction processing on pixel signals obtained in the scanning step using the pixel signals read in the reading step; a storage step of storing the pixel signals from which noise has been reduced in the noise reduction step; and an expansion step of expanding an image using the pixel signals from which noise has been reduced in the noise reduction step on the basis of the expansion ratio.

Further, the foregoing object is also attained by providing an image sensing method in an image sensing apparatus having an area image sensor, a sensor operation unit which controls scanning operation of the area image sensor, and a blur detector which detects blur information of a sensed image, comprising: an area setting step of setting an area to be read of the area image sensor by controlling the sensor operation unit on the basis of the blur information; a scanning step of scanning the area of the area image sensor set in the area setting step; a reading step of reading pixel signals previously stored in a memory in accordance with the area set in the area setting step; a noise reduction step of performing noise reduction processing on pixel signals obtained in the scanning step using the pixel signals read in the reading step; a storage step of storing the pixel signals from which noise has been reduced in the noise reduction step; and a blur correction step of correcting blurs of an image using the pixel signals from which noise has been reduced in the noise reduction step on the basis of the blur information.

Further, the foregoing object is also attained by providing an image processing method for processing pixel signals obtained from an image sensing apparatus having an area image sensor and a sensor operation unit which controls scanning operation of the area image sensor, comprising: an area setting step of setting an area to be read of the area image sensor by controlling the sensor operation unit on the basis of an expansion ratio; a reception step of receiving pixel signals read from the area of the area image sensor set in the area setting step; a reading step of reading pixel signals previously stored in a memory in accordance with the area set in the area setting step; a noise reduction step of performing noise reduction processing on pixel signals received in the reception step using the pixel signals read in the reading step; a storage step of storing the pixel signals from which noise has been reduced in the noise reduction step; and an expansion step of expanding an image using the pixel signals from which noise has been reduced in the noise reduction step on the basis of the expansion ratio.

Further, the foregoing object is also attained by providing an image processing method for processing pixel signals obtained from an image sensing apparatus having an area image sensor, a sensor operation unit which controls scanning operation of the area image sensor, and a blur detector which detects blur information of a sensed image, comprising: an area setting step of setting an area to be read of the area image sensor by controlling the sensor operation unit on the basis of the blur information; a reception step of receiving pixel signals read from the area of the area image sensor set in the area setting step; a reading step of reading pixel signals previously stored in a memory in accordance with the area set in the area setting step; a noise reduction step of performing noise reduction processing on pixel signals received in the reception step using the pixel signals read in the reading step; a storage step of storing the pixel signals from which noise has been reduced in the noise reduction step; and a blur correction step of correcting blurs of an image using the pixel signals from which noise has been reduced in the noise reduction step on the basis of the blur information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are explanatory views showing relationship between signals from a CCD image sensor and signals from a field memory;

FIG. 3 is a block diagram illustrating a configuration of a field circulation type noise reduction circuit;

FIG. 14 is shows an example of a color arrangement of a color filter used in an image sensor.

DETAILED DESCRIPTION OF THE PREFERRED EMBODIMENTS

Preferred embodiments of the present invention will be described in detail below in accordance with the accompanying drawings.

<First Embodiment>

Figure 1:
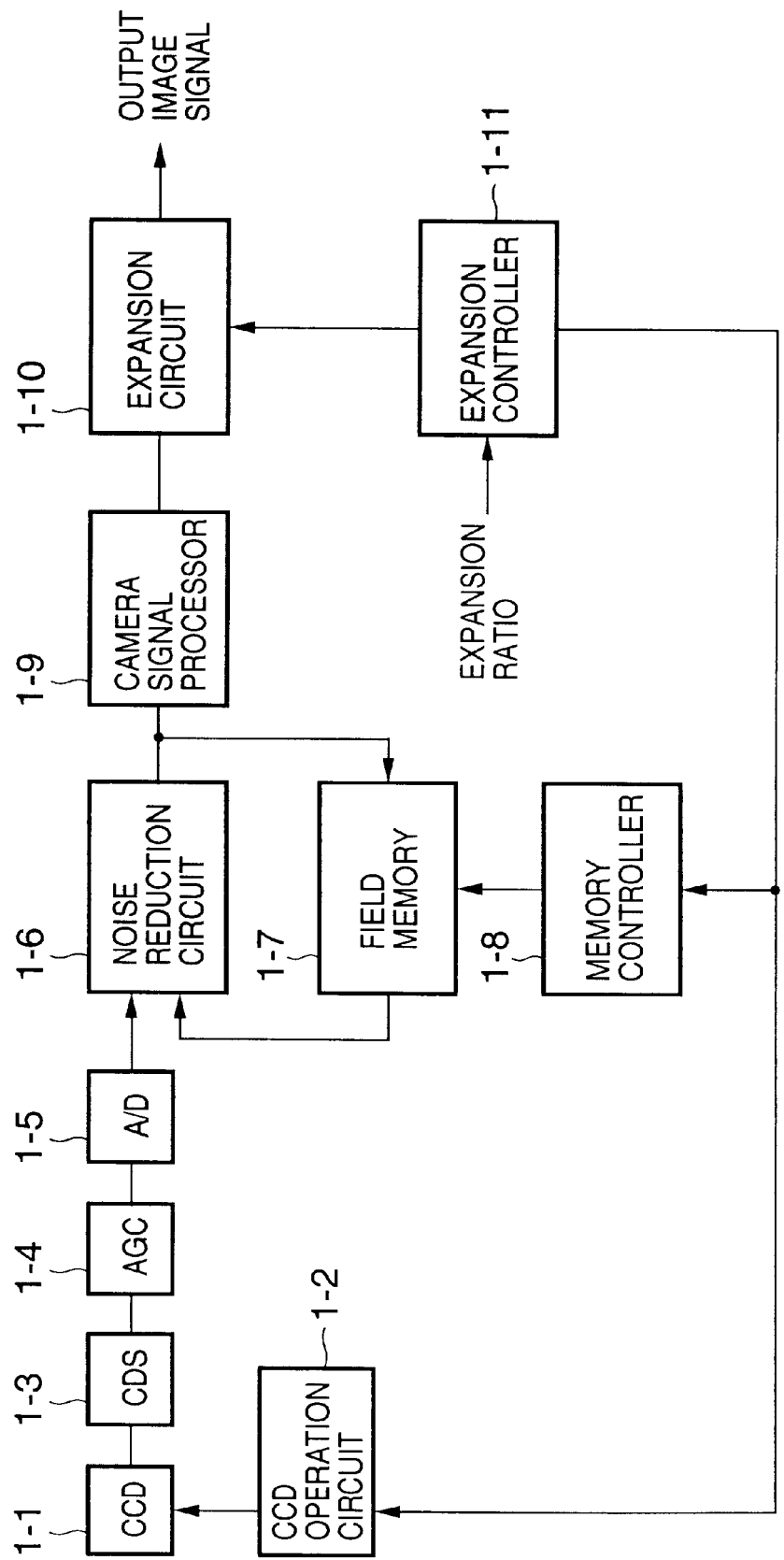
FIG. 1 is a block diagram illustrating a configuration of an image sensing apparatus according to a first embodiment of the present invention

FIG. 1 is a block diagram illustrating a configuration of an image sensing apparatus according to the first embodiment of the present invention.

Figure 12:
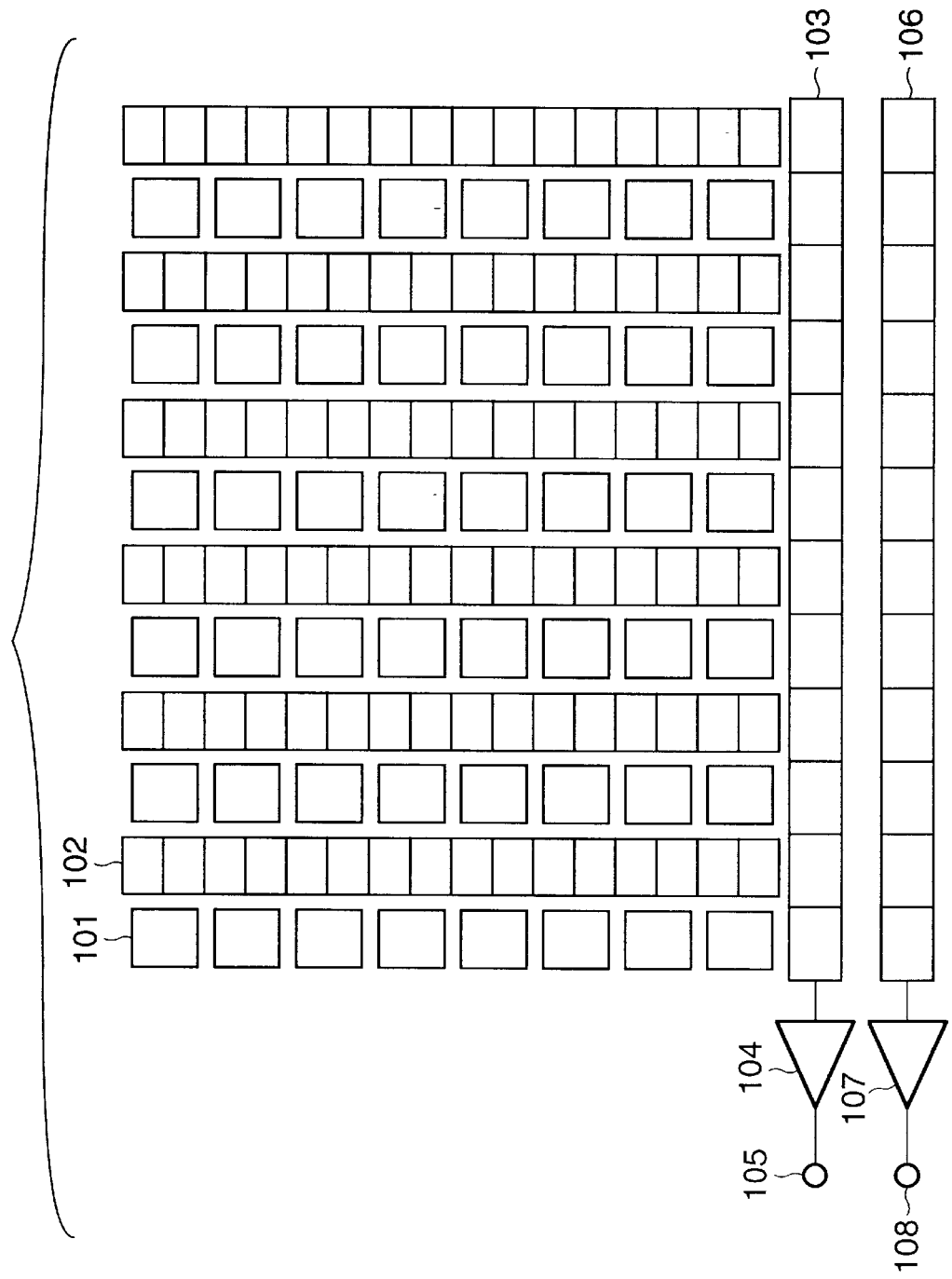
FIG. 12 shows a brief configuration of a two-line output type image sensor.

Referring to FIG. 1, reference numeral 1-1 denotes a CCD image sensor of progressive scanning type which outputs a frame image in $\frac{1}{60}$ seconds by outputting pixel signals by two lines. An example of such a CCD image sensor is shown in FIG. 12. Reference numeral 1-2 denotes an image sensor (CCD) operation circuit for operating the CCD image sensor 1-1; 1-3, a correlated double sampling (CDS) circuit for removing spike-shape noises from the pixel signals obtained from the CCD image sensor 1-1; 1-4, an automatic gain controller (AGC) for adjusting levels of the pixel signals from which the spike-like noises are removed; 1-5, an analog-digital (A/D) converter for digitizing the pixel signals whose levels are adjusted by the automatic gain controller 1-4; 1-6, a noise reduction circuit for reducing noise from the pixel signals digitized by the A/D converter 1-5; 1-7, a field memory for storing the pixel signals of one frame for one field period; 1-8, a memory controller for controlling the field memory 1-7; 1-9, a camera signal processor for applying γ correction and white balance correction to the pixel signals outputted from the noise reduction circuit 1-6 and generating luminance and chromatic signals; 1-10, an expansion circuit for interpolating and expanding an image both in the horizontal and vertical directions by processing the luminance and chromatic signals outputted from the camera signal processor 1-9; and 1-11, an expansion controller for controlling the CCD operation circuit 1-2, the memory controller 1-8, and the expansion circuit 1-10.

Note, in the first embodiment, following explanation is based on a configuration in which reading of signals from the CCD image sensor 1-1 is controlled by line in accordance with an expansion ratio. However, the present invention is also applicable to a configuration in which signals of all the lines (signals of a frame image) are consecutively read out from the CCD image sensor 1-1 and processed by the A/D converter 1-5, then immediately stored in a memory having a capacitance capable of storing a frame image, thereafter signals of necessary lines are outputted from the memory to the next block so as to serve for electronic expansion of the image.

Figure 8:
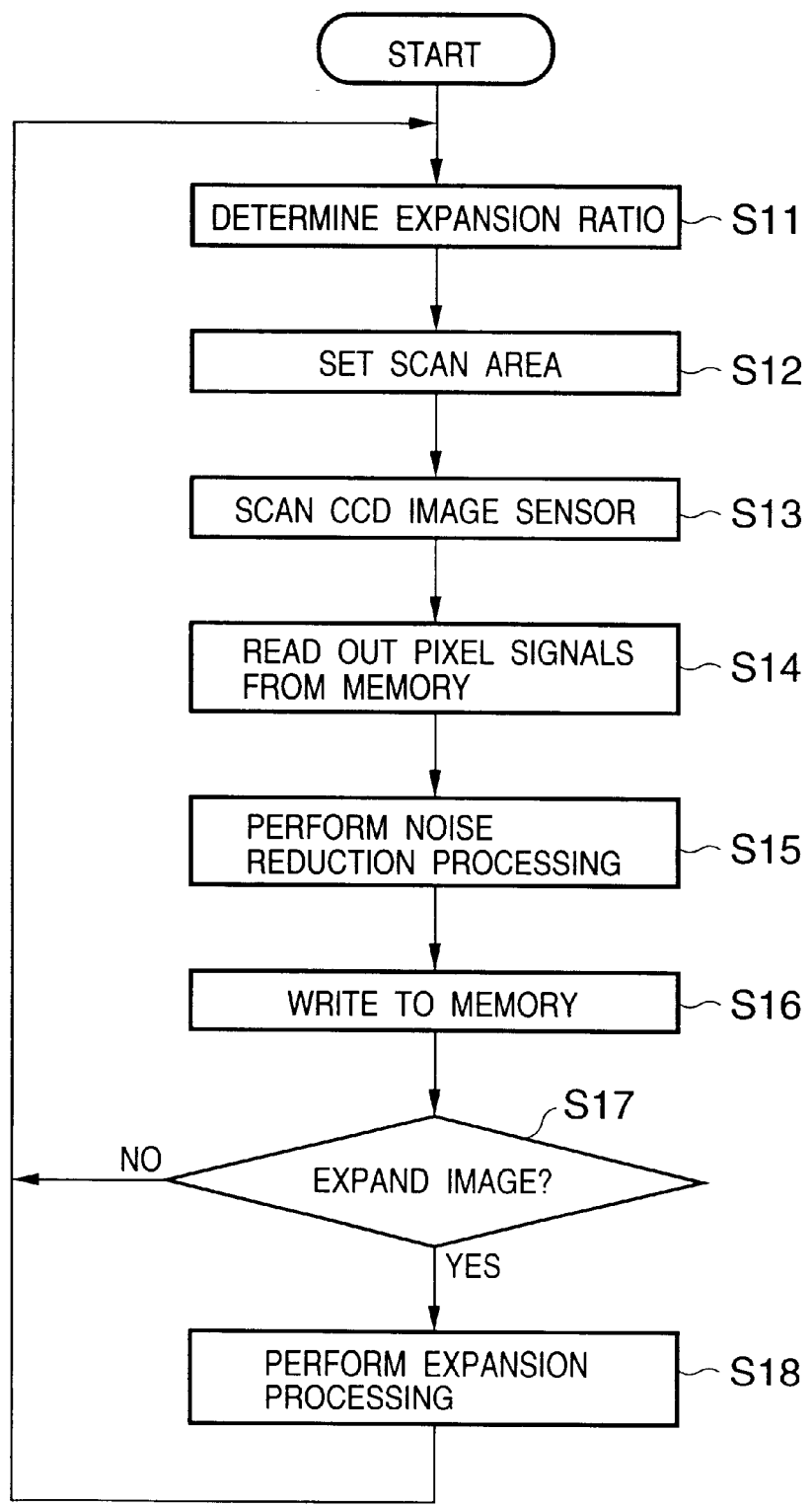
FIG. 8 is a flowchart for explaining an operation of the image sensing apparatus according to the first embodiment of the present invention.

FIG. 8 is a flowchart for explaining an operation of the image sensing apparatus having the foregoing configuration.

First in step S11, the expansion controller 1-11 determines an expansion ratio. The expansion ratio may be inputted by any known method. The expansion controller 1-11 sets a scan area of the CCD image sensor 1-1 on the basis of the expansion ratio (step S12), then pixel signals are read out from the set scan area by a method as will be described later (step S13). It is possible to configure the system so that the CCD operation circuit 1-2 sets the scan area.

Next, in step S14, pixel signals, obtained in the previous scanning operation, which have undergone noise reduction processing by the noise reduction circuit 1-6 are read from the field memory 1-7. In step S15, the noise reduction circuit 1-6 performs noise reduction processing using the pixel signals read out from the CCD image sensor 1-1 in step S13 and the pixel signals read from the field memory 1-7 in step S14. The pixel signals which have undergone the noise reduction processing in step S15 are stored in the field memory 1-7 in step S16. Further, if necessary (i.e., when YES in step S17), expansion processing is performed in step S18 using the pixel signals which have undergone the noise reduction processing in step S15, and then obtained signals are outputted. Processes of steps S12 to S18 will be explained below in more detail.

Figure 9:
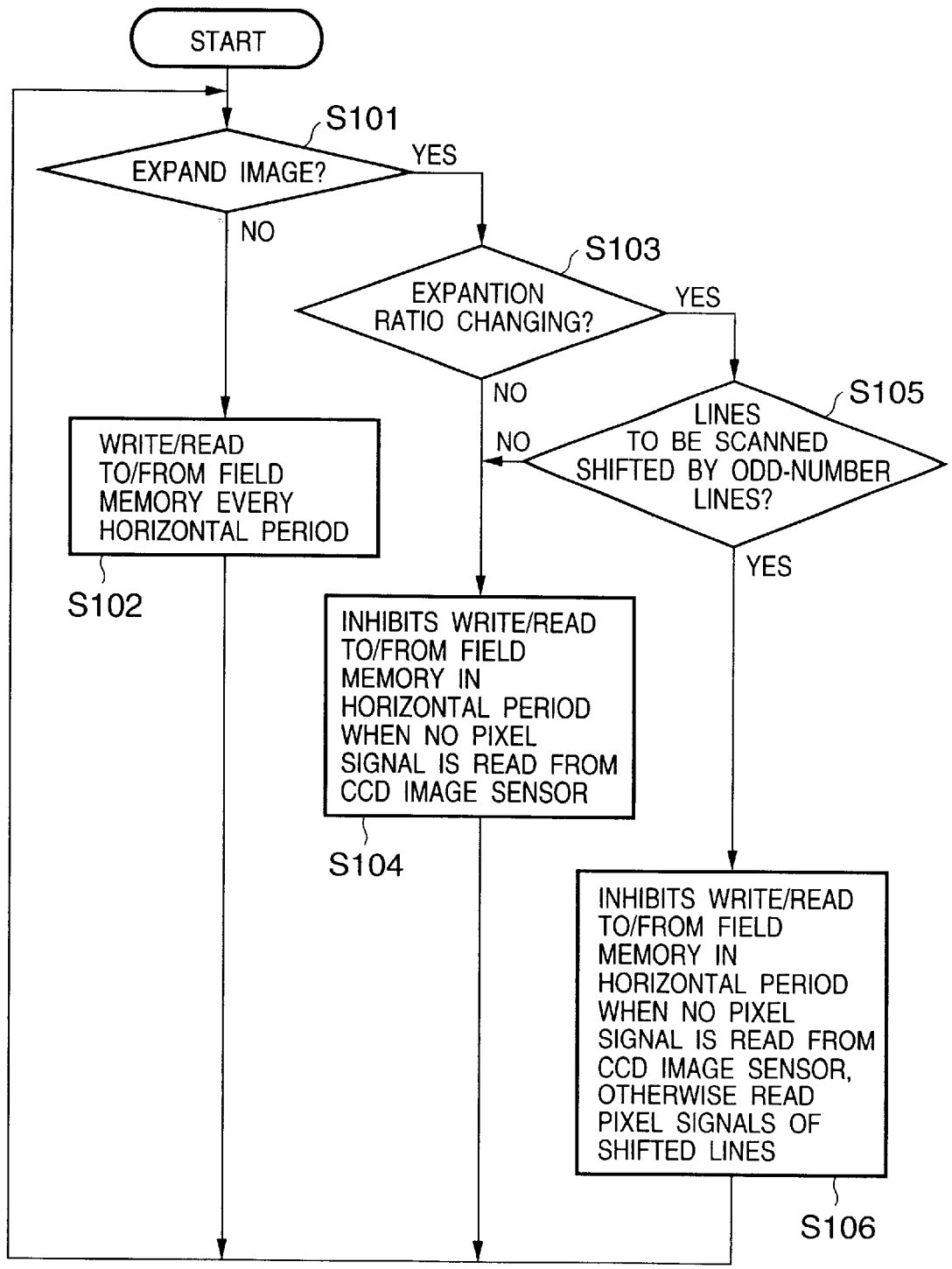
FIG. 9 is a flowchart showing switching of input/output control of a field memory according to the first embodiment of the present invention.

In the first embodiment, a case of performing noise reduction processing and expansion processing of double-sizing the central portion of a sensed image will be explained with reference to FIG. 9. FIG. 9 is a flowchart showing a switching control sequence of the memory controller 1-8 by the expansion controller 1-11 so that the memory controller 1-8 controls writing/reading to/from the field memory 1-7 in a manner as will be described later.

Figure 13:
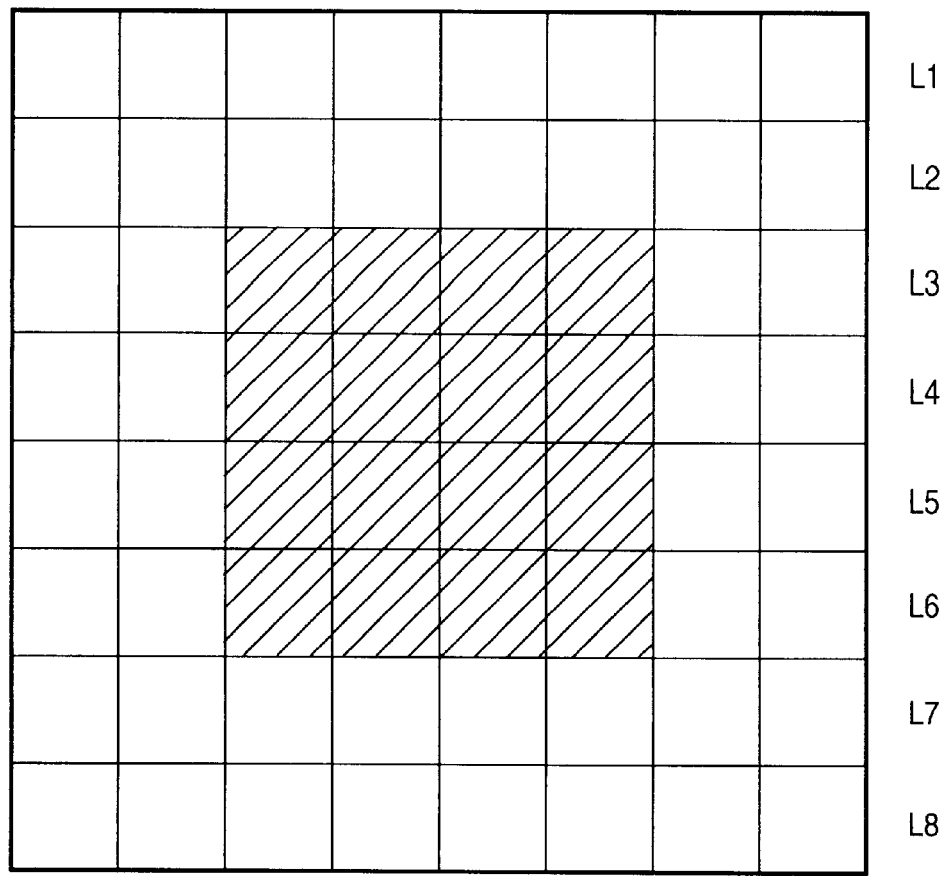
FIG. 13 is an explanatory view for explaining double-sizing expansion processing.

In the first embodiment, double-sizing expansion will be explained, however, it will be appreciated that any expansion ratio can be realized by using more line memories. As described above with reference to FIG. 13, the expansion controller 1-11 controls the CCD operation circuit 1-2 to operate the CCD image sensor 1-1, and upper one-fourth lines (L1 and L2 in FIG. 13) is scanned fast, and scanned pixel signals are discarded. Then, the central lines corresponds to one-half of all the lines (L3 to L6 in FIG. 13) of the CCD image sensor 1-1 are controlled to be intermittently scanned by two lines in every other horizontal scan period. By intermittently scanning the CCD image sensor 1-1 by two lines in every other horizontal scan period as shown in FIG. 2, the operation of reading out signals of two lines and idling for one horizontal scan period is repeated.

The noise reduction circuit 1-6 performs noise reduction processing using current pixel signals and previous pixel signals read out from the field memory 17 as shown in FIG. 3. Referring to FIGS. 2A and 2B, in a case of not expanding an image (NO in step S101 in FIG. 9), n and (n+1) lines are read from the CCD image sensor 1-1 in a period, (n+2) and (n+3) lines are read in a b period, (n+4) and (n+5) lines are read in a c period, and so on, in a continuous manner. Therefore, signals of n and (n+1) lines are read from the field memory 1-7 in the a period, signals of (n+2) and (n+3) lines are read in a b period, signals of (n+4) and (n+5) lines are read in a c period, and so on, in a continuous manner. Then, the noise reduction processing is performed using the signals of corresponding lines between two images, and the resultant pixel signals are written in the field memory 1-7 at the corresponding addresses (control of step S102).

In contrast, the noise reduction processing can not be performed by using the signals continuously read from the field memory 1-7 in the above manner when the expansion processing is performed (YES in step S101), because pixel signals are read out from the CCD image sensor 1-1 intermittently. Therefore, while image expansion is performed with the same expansion ratio, in other words, if the expansion ratio is fixed and not continuously changing in, e.g., zoom-in or zoom-out operation (i.e., while NO in step S103), in a period during which no pixel signal is read out from the CCD image sensor, the expansion controller 1-11 controls the memory controller 1-8 in step S104 to inhibit writing to the field memory 1-7. More specifically, referring to FIG. 2A, n and (n+1) lines are read from the CCD image sensor 1-1 in the a period, scanning operation is inhibited in the b period, (n+2) and (n+3) lines are read in the c period, and so on, in an intermittent manner. Therefore, as shown in FIG. 2B, signals of n and (n+1) lines are read from the field memory 1-7 in the a period, read-out operation is inhibited in the b period, signals of (n+2) and (n+3) lines are read in the c period, and so on, in an intermittent manner. Thus, the appropriate noise reduction processing is performed using the signals of corresponding lines between two images, and the resultant pixel signals are written in the field memory 1-7 at the corresponding addresses (control of step S104).

Processes performed when the expansion ratio is continuously changing will be explained later, and a detail of the expansion circuit 1-10 will be explained with reference to FIG. 4.

Figure 4:
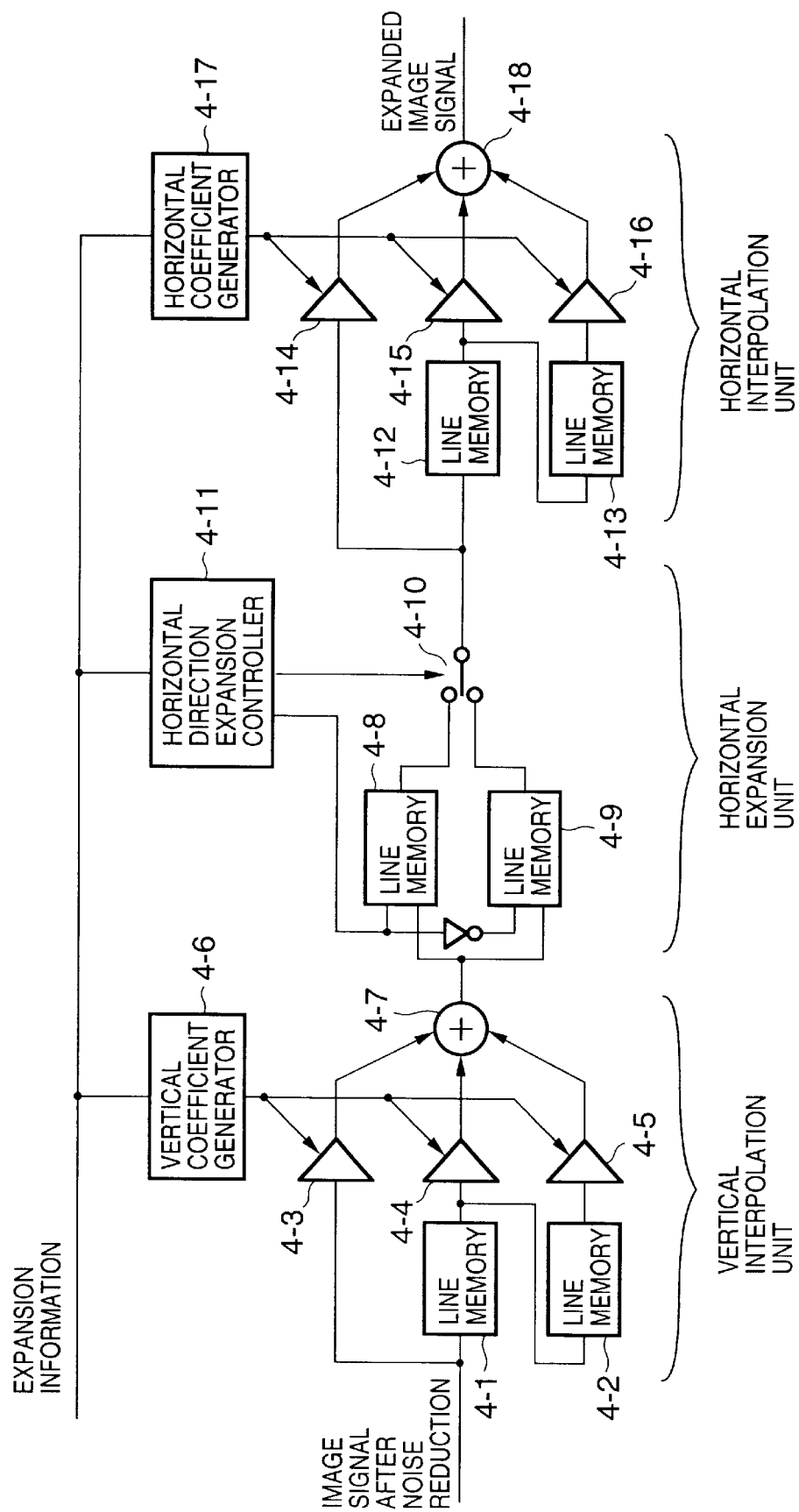
FIG. 4 is a block diagram illustrating a detailed configuration of an expansion circuit.

In FIG. 4, reference numerals 4-1 and 4-2 denote line memories capable of storing image signals of two horizontal lines scanned in one horizontal scan period and outputting them; 4-3, 4-4, and 4-5, coefficient multipliers which comprise a multiplier and a shift operator; 4-6, a vertical coefficient generator for setting coefficients for multiplication to the coefficient multipliers 4-3, 4-4 and 4-5; and 4-7, an adder for adding signals outputted from the coefficient multipliers 4-3, 4-4 and 4-5.

Let the output from the coefficient multiplier 4-4 be a reference signal, then, the output from the coefficient multiplier 4-3 is a signal which is obtained one horizontal scan period after the reference signal, and the output from the coefficient multiplier 4-5 is a signal which is obtained one horizontal scan period before the reference signal. When an image signal inputted to the expansion circuit 1-10 is not expanded and inputted consecutively, the vertical coefficient generator 4-6 sets coefficients 0, 1 and 0 to the coefficient multipliers 4-3, 4-4 and 4-5, respectively. In this case, a signal which is delayed by the line memory 4-1 for one horizontal scan period is inputted from the coefficient multiplier 4-4 to the adder 4-7. Whereas, in a case where an image signal is inputted intermittently to the expansion circuit 1-10 for performing expansion processing, the vertical coefficient generator 4-6 controls coefficients of the coefficient multipliers 4-3, 4-4 and 4-5 so as to generate a signal of a non-inputted line by interpolating between signals of the upper and lower horizontal lines of the line to be interpolated. More specifically, the signal of the non-inputted line is generated by setting coefficients 0.5, 0 and 0.5 to the coefficient multipliers 4-3, 4-4 and 4-5, respectively. The foregoing elements (4-1 to 4-7) are collectively called vertical interpolation unit. Thus, expansion in the vertical direction is realized by interpolating a signal of a horizontal scan period, in which scanning operation is inhibited, based on the signals of the previous and next horizontal scan periods from the CCD image sensor 1-1 scanned in an intermittent manner.

Further, line memories 4-8 and 4-9 store signals outputted from the adder 407 for one horizontal scan period, and output them. A selector 4-10 selects either one of the outputs from the line memories 408 and 409. A horizontal expansion controller 4-11 controls the line memories 4-8 and 4-9 to alternately write and read signals in every horizontal scan period. More specifically, one of the line memories 4-8 and 4-9 is written and the other is read out in one horizontal scan period. Then, the selector 4-10 is controlled to switch between the line memories 4-8 and 4-9 so that signals stored in the line memories 4-8 and 4-9 are read alternately every horizontal scan period. The line memories 4-8 and 4-9 are used to perform expansion in the horizontal direction. When information is written to these line memories, all the information of one horizontal scan period is written without change, and when the information is read out, only image data corresponding to the portion to be expanded (shaded portion in FIG. 13) is outputted. In double-sizing expansion, the horizontal magnification controller 4-11 controls the line memories 4-8 and 4-9 so that after a signal is read out by one clock, then read-out operation for the next clock is inhibited. According to the above control, the pixel data corresponding to the portion to be expanded is outputted in every other clock period. The foregoing elements (4-8 to 4-11) are collectively called a horizontal expansion unit. The signals, expanded in the horizontal direction, outputted from the selector 4-10 are outputted in every other clock period in the aforesaid double-sizing expansion, therefore, it is necessary to interpolate signals between outputted signals.

D flip-flops (DFF) 4-12 and 4-13 store signals of one clock period and output them. Let the output from the coefficient multiplier 4-15 be a reference signal, then, the output from the coefficient multiplier 4-14 is a signal one pixel after the reference signal, and the output from the coefficient multiplier 4-16 is a signal one pixel prior to the reference signal. When an image signal inputted to the horizontal expansion unit is not expanded in the horizontal direction and inputted consecutively, the horizontal coefficient generator 4-17 sets coefficients 0, 1 and 0 to the coefficient multipliers 4-14, 4-15 and 4-16, respectively. In this case, a signal which is delayed by the D flip-flop 4-12 for one clock period is inputted from the coefficient multiplier 4-15 to the adder 4-18. Whereas, in a case where an image signal is inputted intermittently to the horizontal expansion unit for performing expansion processing in the horizontal direction, the horizontal coefficient generator 4-17 controls coefficients of the coefficient multipliers 4-14, 4-15 and 4-16 so as to generate a signal of a non-inputted pixel by interpolating between signals of the previous and next pixels of the pixel to be interpolated. More specifically, the signal of the non-inputted pixel is generated by setting coefficients 0.5, 0 and 0.5 to the coefficient multipliers 4-14, 4-15 and 4-16, respectively. These elements (4-12 to 4-18) are collectively called a horizontal interpolation unit. The expansion processing is performed in the manner as described above.

The noise reduction processing is performed using signals of the one-field previous image from the field memory 1-7 and current signals in the noise reduction circuit 1-6 as described above. In a case where expansion ratio is changing (i.e., an expansion ratio for an image obtained in a given field period differs from an expansion ratio for an image obtained in the next field period when, e.g., performing zoom-in or zoom-out operation) (YES in step S103 in FIG. 9), pixel signals of an even line may be read from the CCD image sensor 1-1 as the first line in a certain field period, and pixel signals of an odd line may be read from the CCD image sensor 1-1 as the first line in the next field period due to the change in expansion ratio (YES in step S105). Referring to FIG. 2A for instance, lines to be scanned are shifted by one line, and (n+1) and (n+2) lines may be read in the a period, scanning operation is inhibited in the b period, (n+3) and (n+4) lines are read in the c period, and so on, in an intermittent manner. In this case, if the field memory 1-7 is intermittently read in the same manner as in a case where the expansion ratio is stable as described above, the noise reduction processing is performed using pixel signals of different color filters, which damages information on color and illuminance of pixel signals as a result.

Thus, if pixel signals output from the CCD image sensor 1-1 and the pixel signals output from the CCD image sensor 1-1 in the one-field previous period have shifted from each other by odd-number lines, in the first embodiment, the expansion controller 1-11 which controls the series of the expansion processing is configured so as to control the field memory controller 1-8 to shift addresses of lines to be read by one line. In a case as shown in FIG. 2A, reading from the field memory 1-7 is controlled so that (n+1) and (n+2) lines are be read in the a period, scanning operation is inhibited in the b period, (n+3) and (n+4) lines are read in the c period, and so on, in an intermittent manner. The read signals undergo noise reduction processing by the noise reduction circuit 1-6, then the resultant pixel signals are written in the field memory 1-7 at the corresponding addresses (control of step S106).

Figure 5:
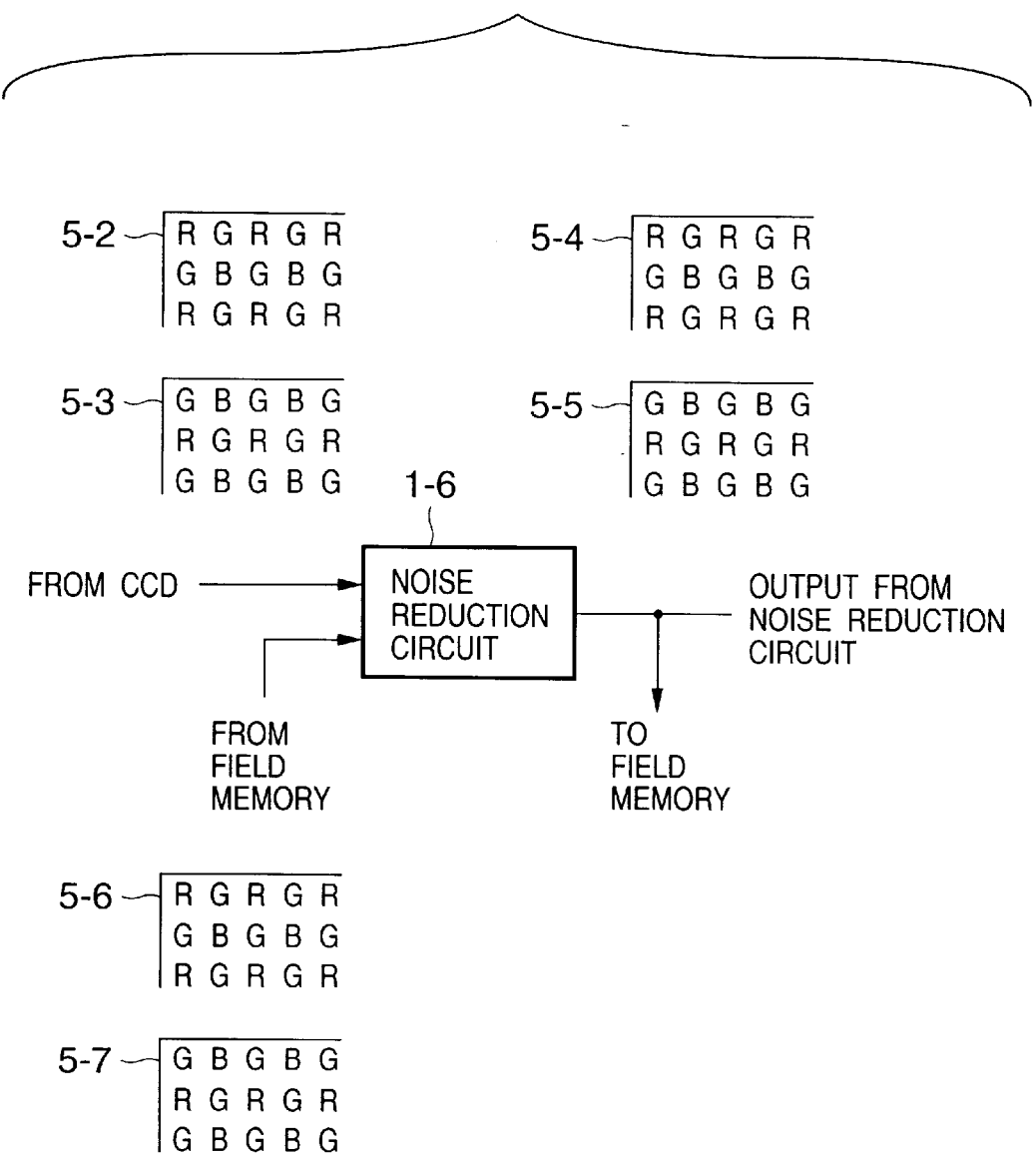
FIG. 5 shows a relationship between a color arrangement of a color filter provided on the image sensor and image signals in a noise reduction circuit.

The relationship between the color filter provided on the CCD image sensor 1-1 and pixel signals inputted/outputted to/from the noise reduction circuit 1-6 is shown in FIG. 5.

In FIG. 5, reference numeral 5-2 represents pixel signals when the first line of a read portion of the CCD image sensor 1-1 is an odd line; 5-3, pixel signals when a read portion of the CCD image sensor 1-1 is shifted by odd-number lines with respect to the portion corresponding to the pixel signals 5-2; 5-4, pixel signals outputted from the noise reduction circuit 1-6 and stored in the field memory 1-7; 5-5, pixel signals outputted from the noise reduction circuit 5-1 shifted by odd-number lines from the pixel signals 5-4 and stored in the field memory 1-7; 5-6, pixel signals read out from the field memory 1-7; and 5-7, pixel signals read out from the field memory 1-7 when lines to be read are shifted by odd-number lines with respect to lines corresponding to the pixel signals 5-6.

If expansion processing is not performed or if performed without changing a expansion ratio, then the pixel signals read out from the CCD image sensor 1-1, pixel signals outputted from the noise reduction circuit 1-6 and the pixel signals of the previous field inputted to the noise reduction circuit 1-6 from the field memory 1-7 are as those shown by 5-2, 5-4, and 5-6 or those shown by 5-3, 5-5, and 5-7. Accordingly, the noise reduction processing is properly performed using pixel signals corresponding to the same color filter.

In contrast, when an expansion ratio is changing and pixel signals of different lines, such as the pixel signals 5-3, shifted by odd-number lines from the lines of the pixel signals, such as the pixel signals 5-2, obtained in the previous scanning operation are outputted from the CCD image sensor 1-1, the expansion controller 1-11 controls the memory controller 1-8 in response to the change in the expansion ratio to shift the read address of the field memory 1-7 by single line so that the pixel signals 5-7 are outputted in place of the pixel signals 5-6. In this manner, the pixel signals read out from the CCD image sensor 1-1 and the pixel signals of the previous field read out from the field memory 107 respectively correspond to the same colors of the color filter, thereby a proper noise reduction processing is performed.

At this time, the pixel signals 5-4 inputted to the noise reduction circuit 1-6 are changed to pixel signals 5-5 outputted from the noise reduction circuit 1-6. Further, a write address of the field memory 1-7 is also controlled to be shifted by one line similarly to the read address. If the order of colors of pixel signals read from the CCD image sensor 1-1 in a given scanning operation is the same as that of pixel signals read in the next scanning operation (i.e., the expansion ratio maintains the same or read portions of the CCD image sensor 1-1 are shifted from each other by even-number lines), the read/write addresses of the field memory 1-7 are controlled in the usual manner.

According to the first embodiment as described above, in a case of expanding an image by controlling operation of the CCD image sensor, it is controlled so that colors of pixel signals read from a field memory are respectively the same as the colors of corresponding pixel signals inputted to a noise reduction circuit from the CCD image sensor. Therefore, it is possible to properly perform the noise reduction processing using pixel signals of two consecutive images respectively corresponding to the same colors, thereby obtaining correct luminance and chromatic signals.

<Second Embodiment>

Figure 6:
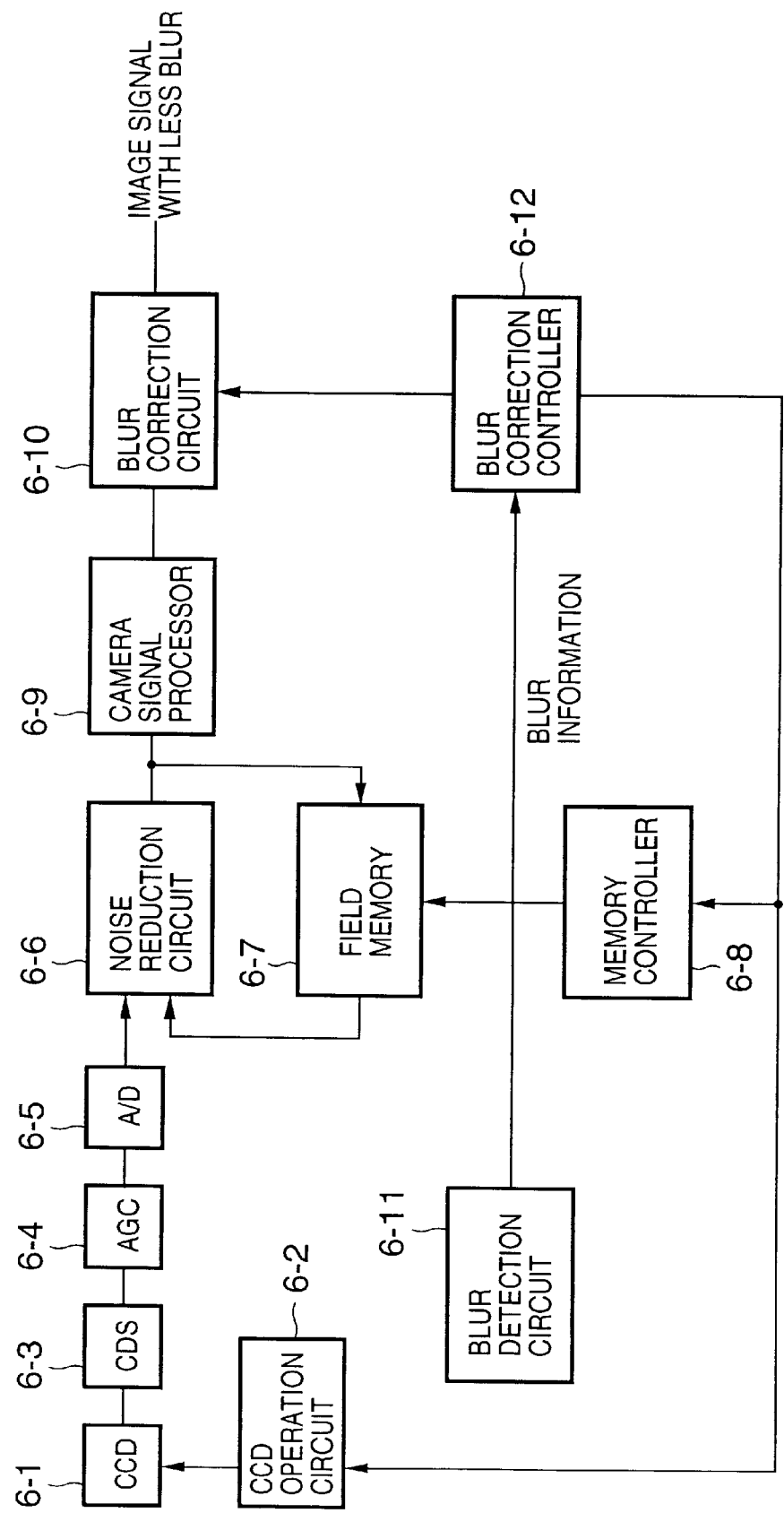
FIG. 6 is a block diagram illustrating a configuration of an image sensing apparatus according to a second embodiment of the present invention.

The second embodiment of the present invention will be explained below. FIG. 6 is a block diagram illustrating a configuration of an image sensing apparatus according to the second embodiment of the present invention. In FIG. 6, configuration elements 6-2 to 6-9 respectively correspond to the elements 1-2 to 1-9 in FIG. 1, therefore, their explanations are omitted.

The CCD image sensor 6-1 has more number of pixels than the number of effective pixels required in, e.g., NTSC and PAL standards. When sensing an image, all the pixels are scanned in the lateral direction, whereas in the longitudinal direction, the pixels in the needless lines are scanned at high speed and discarded. Reference numeral 6-10 denotes a blur correction circuit for correcting blurs of an image using the signals outputted from the camera signal processor 6-9; 6-11, a blur detection circuit for detecting vibration of the image sensing apparatus due to shaking of the hands using, e.g., an angular velocity sensor; 6-12, a blur correction controller for controlling the CCD operation circuit 6-2, the memory controller 6-8, and the blur correction circuit 6-10.

Note, in the second embodiment, following explanation is based on a configuration in which reading of signals from the CCD image sensor 6-1 is controlled by line in accordance with an output from the blur detection circuit 6-11. However, the present invention is also applicable to a configuration in which signals of all the lines (signals of a frame image) are consecutively read out from the CCD image sensor 1-1 and processed by the A/D converter 6-5, then immediately stored in a memory having a capacitance capable of storing a frame image, thereafter signals of necessary lines are outputted from the memory to the next block so as to serve for electronic blur correction.

In the second embodiment, a case of performing both the noise reduction and the blur correction of a sensed image will be explained.

Figure 10:
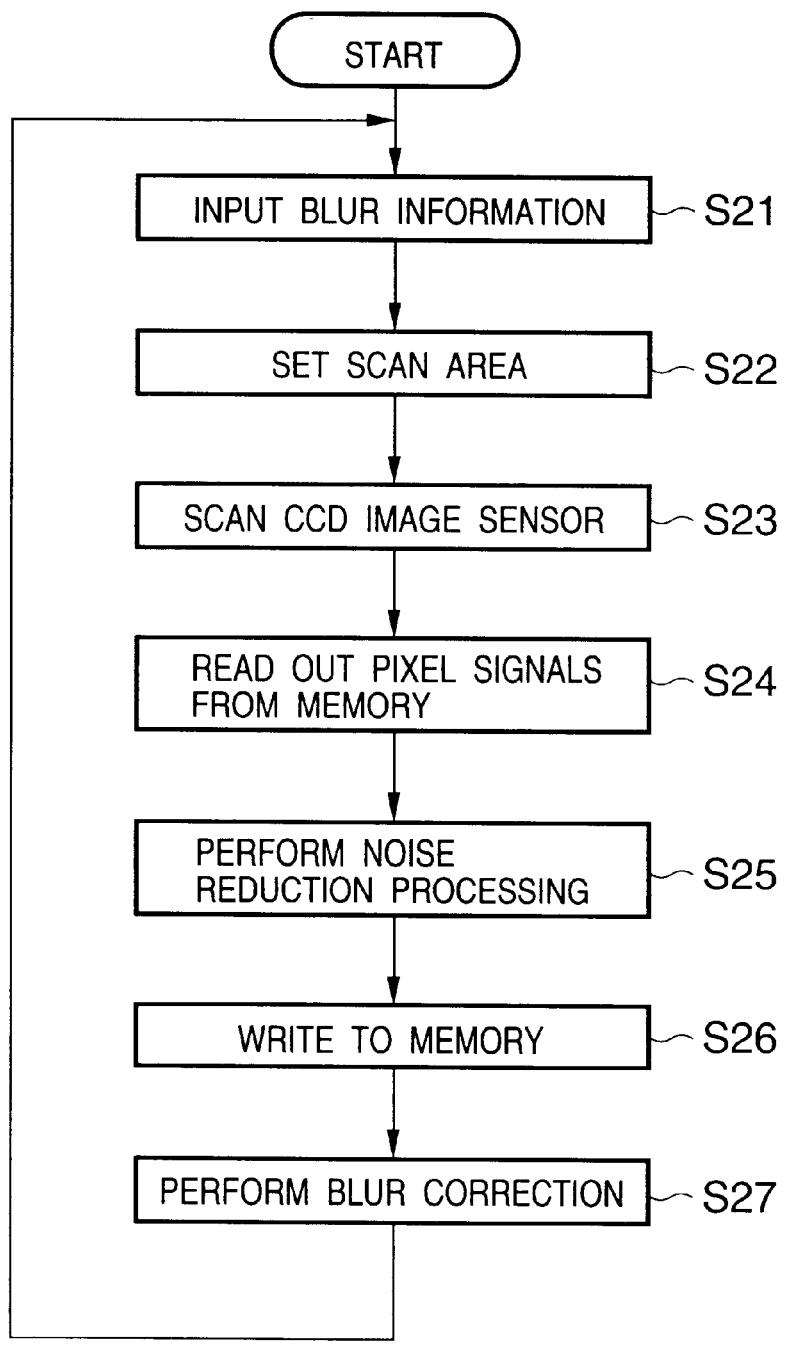
FIG. 10 is a flowchart for explaining an operation of the image sensing apparatus according to the second embodiment of the present invention.

FIG. 10 is a flowchart for explaining an operation of the image sensing apparatus having the foregoing configuration.

First in step S21, the blur detection circuit 6-11 detects blur information. The blur information may be detected by any known method. The blur detection controller 6-12 sets a scan area of the CCD image sensor 6-1 on the basis of the blur information (step S22), then pixel signals are read out from the set scan area in a method as will be described later (step S23). It is possible to configure the unit so that the CCD operation circuit 6-2 sets the scan area.

Next, in step S24, pixel signals, obtained in the previous scanning operation, which have undergone noise reduction processing by the noise reduction circuit 6-6 are read from the field memory 6-7. In step S25, the noise reduction circuit 6-6 performs noise reduction processing using the pixel signals read out from the CCD image sensor 6-1 in step S23 and the pixel signals read from the field memory 6-7 in step S24. The pixel signals which have undergone the noise reduction processing in step S25 are stored in the field memory 6-7 in step S26. Further, blur correction processing is performed in step S27 using the pixel signals which have undergone the noise reduction processing in step S25, and then obtained signals are outputted. A switch for designating ON/OFF of blur correction processing may be added to the image sensing apparatus so as to control ON/OFF condition of blur correction processing. Processes of steps S22 to S27 will be explained below in more detail.

The blur detection sensor 6-11 usually comprises angular velocity sensors for respectively detecting vibration of the image sensing apparatus in the X direction and Y direction. The blur correction controller 6-12 controls the CCD operation circuit 6-2 to read out an image in accordance with blur information inputted from the blur detection circuit 6-11 so that blurs in the vertical direction can be corrected. More specifically, if an object image to be sensed in the current field period is formed at a position of the CCD image sensor 6-1 five lines below a position where the object image is formed in the previous field period due to vibration of the image sensing apparatus, the blur correction controller 6-12 controls to read out the area which is five lines below the area sensed in the previous field period so as to cancel the shift in image formation position.

Figure 11:
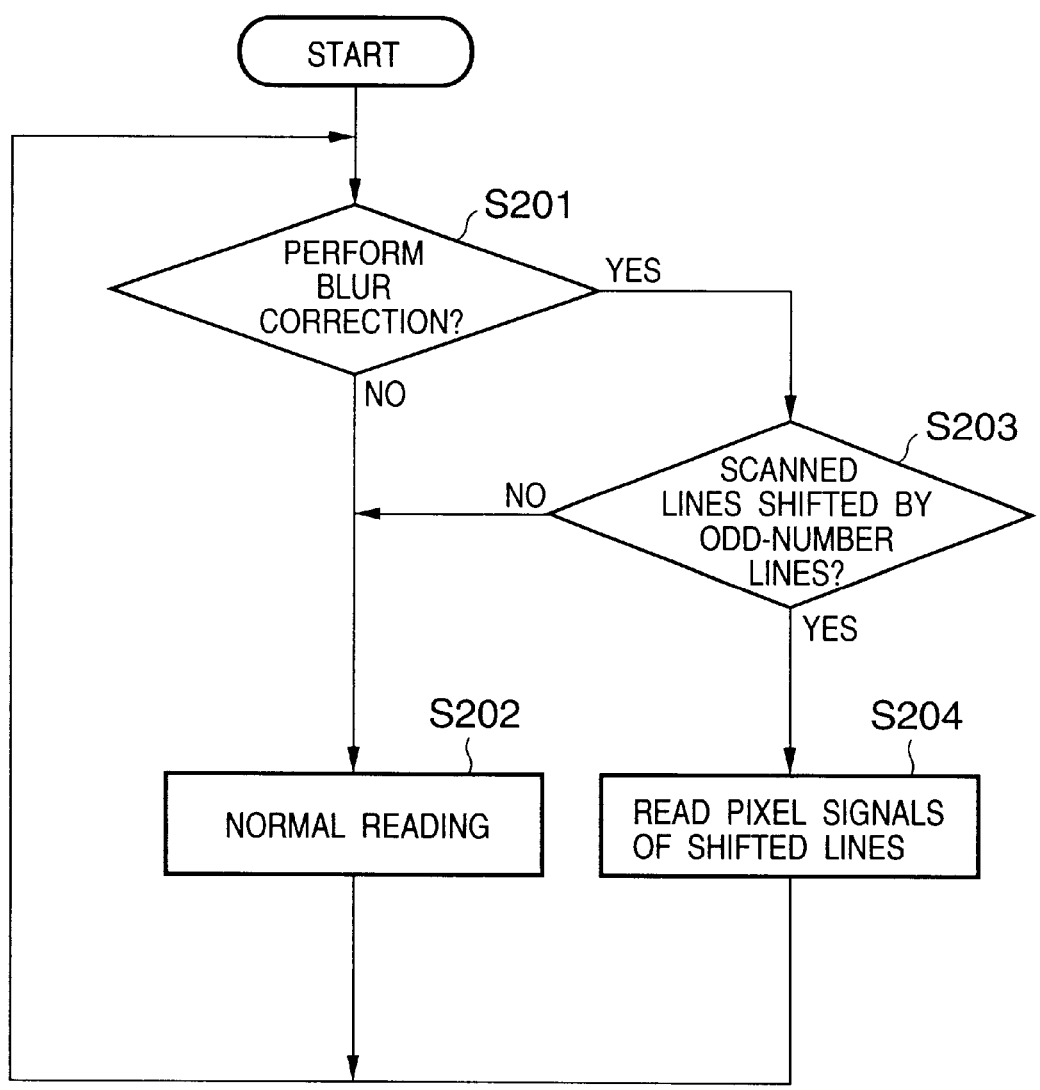
FIG. 11 is a flowchart showing switching of output control of a field memory according to the second embodiment of the present invention.

FIG. 11 is a flowchart showing read control of the field memory 6-7. The noise reduction circuit 6-6 performs a noise reduction processing using pixel signals of the previous field outputted from the field memory 6-7 and current pixel signals. If the blur correction is not performed for the image (NO in step S201 in FIG. 11), no problem will result, and it is controlled to perform normal reading operation from the field memory 6-7 in step S202. In contrast, if the blur correction is activated (YES in step S201), there is a possibility that signals of the first line of the read area of the CCD image sensor 6-1 will be repetition of a red (R) signal and a green (G) signal in one field period, while signals of the first line of the read area in the next field period will be repetition of a G signal and a blue (B) signal because the read areas in the two field periods are shifted from each other by odd-number lines in the vertical direction. If the noise reduction processing is performed in the same manner when the blur correction processing is not performed, the noise reduction processing is performed using corresponding pixel signals which represent different colors. As a result, illuminance and color information of the pixel signals would be damaged.

Accordingly, in the second embodiment, when the pixel signals are read out from an area of the CCD image sensor 6-1 which is shifted from the area read out in the previous field period by odd-number lines by the blur correction controller 6-12 for controlling the series of blur correction processing (YES in step S203), the field memory controller 6-8 controls the read address and write address so as to shift the memory area by one line (or may be odd-number lines) (step S204). With this control, a proper processing is performed by the noise reduction circuit 6-6.

Whereas, when an area to be read from the CCD image sensor 6-1 is shifted by even-number lines for correcting blurs of the image (NO in step S203), pixel signals are read out from the field memory 6-7 in the same manner as when the blur correction processing is not performed in step S202. It should be noted that the present invention is not limited to the operation as described above, and, when the read area of the CCD image sensor 6-1 is shifted by even-number lines, reading of the field memory 6-7 may be controlled so as to output pixel signals of lines shifted by the even-number lines.

The blur correction circuit 6-10 performs blur interpolation in the horizontal direction and interpolation of less than one line in the vertical direction using the pixel signals which have undergone the aforesaid blur correction in the vertical direction.

Figure 7:
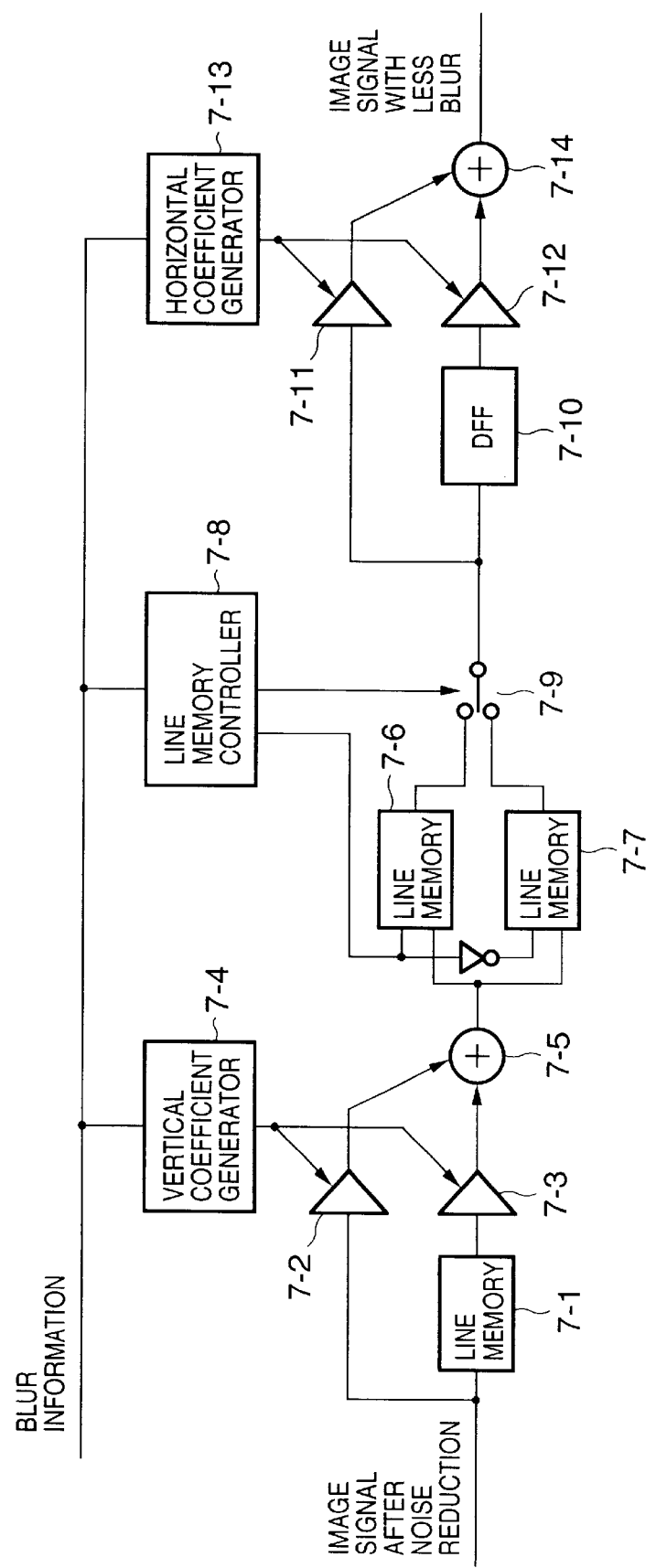
FIG. 7 is a block diagram illustrating a detailed configuration of a blur correction circuit.

FIG. 7 shows a detailed configuration of the blur correction circuit 6-10.

In FIG. 7, reference numeral 7-1 denotes a line memory capable of storing image signals for one horizontal line (one line) and outputs them; 7-2 and 7-3, coefficient multipliers each comprises a multiplier or a shift operator; 7-4, a vertical coefficient generator for setting coefficients for multiplication to the coefficient multipliers 7-2 and 7-3; and 7-5, an adder for adding signals outputted from the coefficient multipliers 7-2 and 7-3. These elements (7-1 to 7-5) are collectively called a vertical interpolation unit for interpolating image signals in the vertical direction.

The CCD operation circuit 6-2 is controlled by the blur correction controller 6-12 so as to cancel blurs in the vertical direction, and in turn, the CCD image sensor 6-1 reads out lines so as to cancel the blurs in the vertical direction in accordance with the control. It should be noted that, since scan control of the CCD image sensor 6-1 can be performed by unit of line, blur correction of less than one line in the vertical direction is not possible with this control. Therefore, the blur correction circuit 6-10 carries out blur correction of less than one line. If a current image is to be further shifted by 0.5 line to correct blurs in the vertical direction, the position where each line of the image is to be placed after blur correction is the middle position between a line inputted to the coefficient multiplier 7-2 and its previous line inputted to the coefficient multiplier 7-3. In this case, the vertical coefficient generator 7-4 sets the coefficients 0.5 to the coefficient multipliers 7-2 and 7-3. Then, the products of the multiplication are added by the adder 7-5, thereby realizing blur correction less than one line in the vertical direction. In a case of shifting a line to other intermediate position between lines in the vertical direction, the vertical coefficient generator 7-4 generates coefficients in a similar manner as described above, and then, the outputs from the coefficient multipliers 7-2 and 7-3 are added by the adder 7-5, thereby blur correction less than one line can be performed. Note that the blur correction by unit of horizontal line is realized by shifting scan area of the CCD image sensor 6-1 by an arbitrary number of lines, as described above.

Line memories 7-6 and 7-7 store the signals which have undergone the blur correction in the vertical direction outputted from the adder 7-5 for a horizontal scan period, and output them. A selector 7-9 selects either of the outputs from the line memories 7-6 and 7-7. A line memory controller 7-8 controls the line memories 7-6 and 7-7 to alternately write and read signals in every horizontal scan period. More specifically, one of the line memories 7-6 and 7-7 is written and the other is read out in one horizontal scan period.

Upon writing and reading to/from the line memories 7-6 and 7-7, blur correction by pixel in the horizontal direction is performed. In order to carry out the blur correction, there are two ways: (1) shifting the top write addresses of the line memories 7-6 and 7-7 so as to cancel the blurs, and keeping the top reading addresses fixed; and (2) keeping the top write addresses of the line memories 7-6 and 7-7 fixed, and shifting the top reading addresses so as to cancel the blurs. The selector 7-9 is controlled to select the output from either of the line memories 7-6 and 7-7 which is read under control of the line memory controller 7-8. The selection of the line memories 7-6 and 7-7 is switched every horizontal scan period. Thus, the blur correction by pixel in the horizontal direction is realized.

In order to correct blurs less than one pixel in the horizontal direction, the pixel signals outputted from the selector 7-9 are inputted to a coefficient multiplier 7-11 directly, and to a coefficient multiplier 7-12 after being delayed for a clock period by a D flip-flop (DFF) 7-10. Similarly to the aforesaid blur correction of less than one line in the vertical direction, if a pixel which is subjected to blur correction is supposed to be at a middle position between two consecutive pixels, a horizontal coefficient generator 7-13 sets coefficient 0.5 to both of the coefficient multipliers 7-11 and 7-12. Then, the respective products are added by an adder 7-14, thereby the blur correction less than one pixel in the horizontal direction is realized. In order to correct the position of the pixels to other intermediate position, the horizontal coefficient generator 7-13 determines coefficients in a similar manner, and then, the outputs from the coefficient multipliers 7-11 and 7-12 are added by the adder 7-14 to generate an interpolated signal, thereby realizing blur correction of less than one pixel.

According to the second embodiment as described above, in a case of correcting blurs by controlling operation of the CCD image sensor, it is controlled so that colors of pixel signals read from a field memory are respectively the same as the colors of corresponding pixel signals inputted to a noise reduction circuit from the CCD image sensor. Therefore, it is possible to properly perform the noise reduction processing using pixel signals of two consecutive images respectively corresponding to the same colors, thereby obtaining correct luminance and chromatic signals.

In the above first and second embodiments, the color filter provided on the CCD image sensor are of primary colors; however, the present invention is not limited to this, and the filter may be of complementary colors. Further, a progressive scan type CCD image sensor is used in the first and second embodiments, however, it may be replaced by an interlace scan type CCD image sensor.

<Other Embodiment>

The present invention can be realized in a form of a system constituted by a plurality of devices (e.g., host computer, interface, a camera head) or applicable to an apparatus comprising a single device (e.g., copying machine, facsimile machine, digital camera, video camera). In the former case, a camera head may include elements corresponding to the CCD 1-1 or 6-1, CCD operation circuit 1-3 or 6-2, CDS 1-3 or 6-3, AGC 1-4 or 6-4, and A/D converter 1-5 or 6-5, and a host computer may includes elements shown in FIG. 1 or 6 other than above. The camera head may further include an element corresponding to the blur detection circuit 6-11.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts FIGS. 8 and 9 or FIGS. 10 and 11 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:

an area image sensor;

a sensor operation unit which controls scanning operation of said area image sensor;

area setting means for setting an area to be read of said area image sensor by controlling said sensor operation unit on the basis of an expansion ratio;

a noise reduction unit which performs noise reduction processing on pixel signals obtained by consecutively scanning said area image sensor at different timings;

memory which holds the pixel signals from which noise has been reduced by said noise reduction unit;

a memory controller which controls reading of pixel signals from said memory in accordance with the area to be read set by said area setting means; and an expansion unit which expands an image using the pixel signals outputted from said noise reduction unit on the basis of the expansion ratio, wherein the pixel signals used in said noise reduction unit are pixel signals read from said memory and respective current pixel signals obtained by scanning said area image sensor.

2. The image sensing apparatus according to claim 1, wherein, when image expansion is not performed, said sensor operation unit controls to scan said area image sensor at every predetermined period, whereas, when image expansion is performed, said sensor operation unit controls to scan said area image sensor every other predetermined period, and said memory controller controls said memory so that writing of the pixel signals is permitted when the area image sensor is scanned, and writing of the pixel signals is inhibited otherwise.

3. The image sensing apparatus according to claim 1, wherein said area image sensor is a color image sensor having a color filter in which a plurality of colors are arranged periodically by a plurality of horizontal lines, and when the expansion ratio changes with lapse of time, said memory controller controls to read pixel signals, from said memory, having the same color pattern as the filter arrangement of the line whose respective pixel signals are currently scanned, from said area image sensor.

4. An image sensing apparatus comprising:

an area image sensor;

a sensor operation unit which controls scanning operation of said area image sensor;

a blur detector which detects blur information of a sensed image;

area setting means for setting an area to be read of said area image sensor by controlling said sensor operation unit on the basis of the blur information;

a noise reduction unit which performs noise reduction processing on pixel signals obtained by consecutively scanning said area image sensor at different timings;

memory which holds the pixel signals from which noise has been reduced by said noise reduction unit;

a memory controller which controls reading of pixel signals from said memory in accordance with the area to be read set by said area setting means; and a blur correction unit which corrects blurs of an image using the pixel signals outputted from said noise reduction unit on the basis of the blur information detected by said blur detection unit, wherein the pixel signals used in said noise reduction unit are pixel signals read from said memory and respective current pixel signals obtained by scanning said area image sensor.

5. The image sensing apparatus according to claim 4, wherein said area image sensor is a color image sensor having a color filter in which a plurality of colors are arranged periodically by a plurality of horizontal lines, and when performing blur correction, said memory controller controls to read pixel signals, from said memory, having the same color pattern as the filter arrangement of the line whose respective pixel signals are currently scanned, from said area image sensor.

6. An image processing apparatus for processing pixel signals obtained from an image sensing apparatus having an area image sensor and a sensor operation unit which controls scanning operation of said area image sensor, comprising:

area setting means for setting an area to be read of said area image sensor by controlling said sensor operation unit on the basis of an expansion ratio;

a noise reduction unit which performs noise reduction processing on pixel signals obtained by consecutively scanning said area image sensor at different timings;

memory which holds the pixel signals from which noise has been reduced by said noise reduction unit;

a memory controller which controls reading of pixel signals from said memory in accordance with the area to be read set by said area setting means; and an expansion unit which expands an image using the pixel signals outputted from said noise reduction unit on the basis of the expansion ratio, wherein the pixel signals used in said noise reduction unit are pixel signals read from said memory and respective current pixel signals obtained by scanning said area image sensor.

7. The image processing apparatus according to claim 6, wherein, when image expansion it not performed, said sensor operation unit controls to scan said area image sensor at every predetermined period, whereas, when image expansion is performed, said sensor operation unit controls to scan said area image sensor every other predetermined period, and said memory controller controls said memory so that writing of the pixel signals is permitted when the area image sensor is scanned, and writing of the pixel signals is inhibited otherwise.

8. The image processing apparatus according to claim 6, wherein said area image sensor is a color image sensor having a color filter in which a plurality of colors are arranged periodically by a plurality of horizontal lines, and when the expansion ratio changes with lapse of time, said memory controller controls to read pixel signals, from said memory, having the same color pattern as the filter arrangement of the line whose respective pixel signals are currently scanned, from said area image sensor.

9. An image processing apparatus for processing pixel signals obtained from an image sensing apparatus having an area image sensor, a sensor operation unit which controls scanning operation of said area image sensor, and a blur detector which detects blur information of a sensed image, comprising:

area setting means for setting an area to be read of said area image sensor by controlling said sensor operation unit on the basis of the blur information;

a noise reduction unit which performs noise reduction processing on pixel signals obtained by consecutively scanning said area image sensor at different timings;

memory which holds the pixel signals from which noise has been reduced by said noise reduction unit;

a memory controller which controls reading of pixel signals from said memory in accordance with the area to be read set by said area setting means; and a blur correction unit which corrects blurs of an image using the pixel signals outputted from said noise reduction unit on the basis of the blur information detected by said blur detection unit, wherein the pixel signals used in said noise reduction unit are pixel signals read from said memory and respective current pixel signals obtained by scanning said area image sensor.

10. The image processing apparatus according to claim 9, wherein said area image sensor is a color image sensor having a color filter in which a plurality of colors are arranged periodically by a plurality of horizontal lines, and when performing blur correction, said memory controller controls to read pixel signals, from said memory, having the same color pattern as the filter arrangement of the line whose respective pixel signals are currently scanned, from said area image sensor.

11. An image sensing method in an image sensing apparatus having an area image sensor and a sensor operation unit which controls scanning operation of said area image sensor, comprising:

an area setting step of setting an area to be read of said area image sensor by controlling said sensor operation unit on the basis of an expansion ratio;

a scanning step of scanning the area of said area image sensor set in said area setting step;

a reading step of reading pixel signals previously stored in a memory in accordance with the area set in said area setting step;

a noise reduction step of performing noise reduction processing on pixel signals obtained in said scanning step using the pixel signals read in said reading step;

a storage step of storing the pixel signals from which noise has been reduced in said noise reduction step; and an expansion step of expanding an image using the pixel signals from which noise has been reduced in said noise reduction step on the basis of the expansion ratio.

12. The image sensing method according to claim 11, wherein, when image expansion is not performed, said sensor operation unit controls to scan said area image sensor at every predetermined period, whereas, when image expansion is performed, said sensor operation unit controls to scan said area image sensor every other predetermined period, and in said storage step, the pixel signals is written to the memory in a predetermined period when the area image sensor is scanned, and writing of the pixel signals is skipped otherwise.

13. The image sensing method according to claim 11, wherein said area image sensor is a color image sensor having a color filter in which a plurality of colors are arranged periodically by a plurality of horizontal lines, and when the expansion ratio changes with lapse of time, in said reading step, pixel signals having the same color pattern as the filter arrangement of the line whose respective pixel signals are currently scanned from said area image sensor are read from said memory.

14. An image sensing method in an image sensing apparatus having an area image sensor, a sensor operation unit which controls scanning operation of said area image sensor, and a blur detector which detects blur information of a sensed image, comprising:

an area setting step of setting an area to be read of said area image sensor by controlling said sensor operation unit on the basis of the blur information;

a scanning step of scanning the area of said area image sensor set in said area setting step;

a reading step of reading pixel signals previously stored in a memory in accordance with the area set in said area setting step;

a noise reduction step of performing noise reduction processing on pixel signals obtained in said scanning step using the pixel signals read in said reading step;

a storage step of storing the pixel signals from which noise has been reduced in said noise reduction step; and a blur correction step of correcting blurs of an image using the pixel signals from which noise has been reduced in said noise reduction step on the basis of the blur information.

15. The image sensing method according to claim 14, wherein said area image sensor is a color image sensor having a color filter in which a plurality of colors are arranged periodically by a plurality of horizontal lines, and when performing blur correction, in said reading step, read pixel signals having the same color pattern as the filter arrangement of the line whose respective pixel signals are currently scanned from said area image sensor are read from said memory.

16. An image processing method for processing pixel signals obtained from an image sensing apparatus having an area image sensor and a sensor operation unit which controls scanning operation of said area image sensor, comprising:

an area setting step of setting an area to be read of said area image sensor by controlling said sensor operation unit on the basis of an expansion ratio;

a reception step of receiving pixel signals read from the area of said area image sensor set in said area setting step;

a reading step of reading pixel signals previously stored in a memory in accordance with the area set in said area setting step;

a noise reduction step of performing noise reduction processing on pixel signals received in said reception step using the pixel signals read in said reading step;

a storage step of storing the pixel signals from which noise has been reduced in said noise reduction step; and an expansion step of expanding an image using the pixel signals from which noise has been reduced in said noise reduction step on the basis of the expansion ratio.

17. The image processing method according to claim 16, wherein, when image expansion is not performed, said sensor operation unit controls to scan said area image sensor at every predetermined period, whereas, when image expansion is performed, said sensor operation unit controls to scan said area image sensor every other predetermined period, and in said storage step, the pixel signals is written to the memory in a predetermined period when the area image sensor is scanned, and writing of the pixel signals is skipped otherwise.

18. The image processing method according to claim 16, wherein said area image sensor is a color image sensor having a color filter in which a plurality of colors are arranged periodically by a plurality of horizontal lines, and when the expansion ratio changes with lapse of time, in said reading step, pixel signals having the same color pattern as the filter arrangement of the line whose respective pixel signals are currently scanned from said area image sensor are read from said memory.

19. An image processing method for processing pixel signals obtained from an image sensing apparatus having an area image sensor, a sensor operation unit which controls scanning operation of said area image sensor, and a blur detector which detects blur information of a sensed image, comprising:

an area setting step of setting an area to be read of said area image sensor by controlling said sensor operation unit on the basis of the blur information;

a reception step of receiving pixel signals read from the area of said area image sensor set in said area setting step;

a reading step of reading pixel signals previously stored in a memory in accordance with the area set in said area setting step;

a noise reduction step of performing noise reduction processing on pixel signals received in said reception step using the pixel signals read in said reading step;

a storage step of storing the pixel signals from which noise has been reduced in said noise reduction step; and a blur correction step of correcting blurs of an image using the pixel signals from which noise has been reduced in said noise reduction step on the basis of the blur information.

20. The image processing method according to claim 19, wherein said area image sensor is a color image sensor having a color filter in which a plurality of colors are arranged periodically by a plurality of horizontal lines, and when performing blur correction, in said reading step, read pixel signals having the same color pattern as the filter arrangement of the line whose respective pixel signals are currently scanned from said area image sensor are read from said memory.

21. A computer program product comprising a computer usable medium having computer readable program code means embodied in said medium for processing pixel signals obtained from an image sensing apparatus having an area image sensor and a sensor operation unit which controls scanning operation of said area image sensor, said product including:

first computer readable program code means for setting an area to be read of said area image sensor by controlling said sensor operation unit on the basis of an expansion ratio;

second computer readable program code means for receiving pixel signals read from the set area of said area image sensor;

third computer readable program code means for reading pixel signals previously stored in a memory in accordance with the set area;

fourth computer readable program code means for performing noise reduction processing on received pixel signals using the pixel signals read from the memory;

fifth computer readable program code means for storing the pixel signals from which noise has been reduced; and sixth computer readable program code means for expanding an image using the pixel signals from which noise has been reduced on the basis of the expansion ratio.

22. A computer program product comprising a computer usable medium having computer readable program code means embodied in said medium for processing pixel signals obtained from an image sensing apparatus having an area image sensor, a sensor operation unit which controls scanning operation of said area image sensor, and a blur detector which detects blur information of a sensed image, said product including:

first computer readable program code means for setting an area to be read of said area image sensor by controlling said sensor operation unit on the basis of the blur information;

second computer readable program code means for receiving pixel signals read from the set area of said area image sensor;

third computer readable program code means for reading pixel signals previously stored in a memory in accordance with the set area;

fourth computer readable program code means for performing noise reduction processing on received pixel signals using the pixel signals read from the memory;

fifth computer readable program code means for storing the pixel signals from which noise has been reduced; and sixth computer readable program code means for correcting blurs of an image using the pixel signals from which noise has been reduced on the basis of the blur information.

* * * * *